Oct. 11, 1932.  W. J. GUILD  1,881,522

WORKHEAD

Filed May 1, 1929

Inventor
Waldo J. Guild
By Geo. H. Kennedy Jr.
Attorney

Patented Oct. 11, 1932

1,881,522

UNITED STATES PATENT OFFICE

WALDO J. GUILD, OF WORCESTER, MASSACHUSETTS, ASSIGNOR TO THE HEALD MACHINE COMPANY, OF WORCESTER, MASSACHUSETTS, A CORPORATION OF MASSACHUSETTS

WORKHEAD

Application filed May 1, 1929. Serial No. 359,608.

The invention relates to workheads adapted to journal a workpiece holding chuck in order that a workpiece may be rotated and acted upon by a tool. The workhead of the invention is particularly adapted for a grinding machine of the type disclosed in my prior and copending application, Serial No. 276,381 filed May 9, 1928, now Patent No. 1,856,185, issued May 3, 1932. This application discloses an internal grinding machine having a pair of grinding wheels on spindles located at opposite sides of the machine and adapted to simultaneously grind a hollow workpiece from both ends thereof. To construct a workhead and chuck for a machine of this type has presented peculiar problems which were solved by the present invention.

The general practice in chucks for internal grinding machines has been to mount the chuck at one end of a long spindle. The spindle, owing to its length, could be readily journalled so as to eliminate practically all angular movement of the axis thereof. In journalling a chuck open at both ends, however, it is not possible to employ a spindle, the chuck being necessarily contained within a sleeve of considerable diameter. To journal this sleeve in the workhead it was desirable to use ball bearings, but it was found that the races of said ball bearings had a tendency to warp, either during heat treatment, which is so necessary to these bearings, or afterwards, and since the sleeve is necessarily short, the resultant angular displacement and vibration of the axis of the chuck could not be restrained by tightening the bearings in a radial direction.

The present invention, therefore, involves means for eliminating the warpage in the races of large ball bearings in order that a chuck open at both ends may be journalled to rotate without displacement of its axis.

The foregoing will more fully appear from the following detailed description taken in connection with the accompanying drawing, in which—

Like reference characters refer to like parts throughout the drawing.

Figure 1:
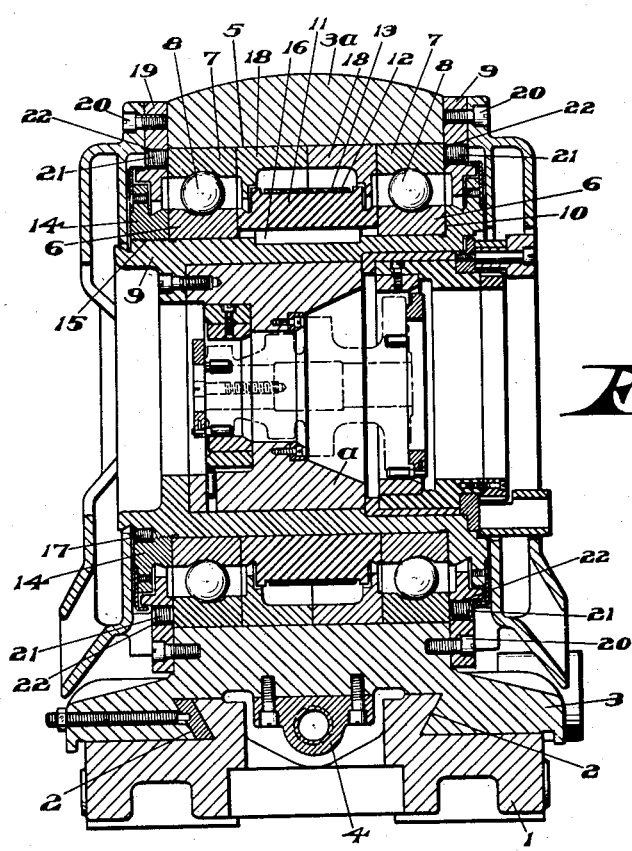
Fig. 1 is a vertical axial sectional view of the workhead of the invention.
Figure 2:
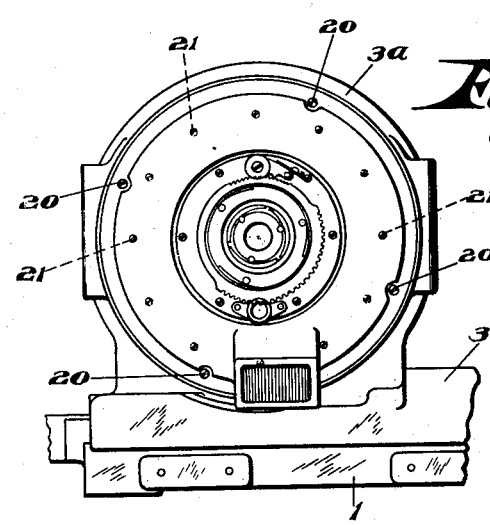
Fig. 2 is an elevation of one end of the workhead on a somewhat reduced scale.

Referring first to Fig. 1, the workhead of the invention may be mounted in any suitable manner upon a machine. In this instance it is shown mounted for cross or transverse feed on the machine base, in order that by a single feeding movement, two or more grinding operations may be performed. Referring therefore to Figs. 1 and 2, a base plate 1 is provided which is suitably attached to the machine, this base plate providing ways 2, 2 upon which the corresponding dove-tailed portions of a cross slide 3 rest. By means of an internally threaded member 4, commonly called a nut, the cross slide may be fed transversely of the machine base by rotation of a screw shaft.

Integrally formed with the cross slide 3 is an annular portion 3a whose interior cylindrical surface 5 constitutes the receptacle for the workhead journals. Such journals comprise a pair of ball bearings, the construction of which and the relation of which to the present invention will now be described.

Figure 3:
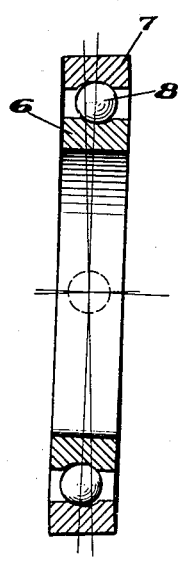
Fig. 3 is a sectional view of a ball bearing for a workhead illustrating warped bearing races, the warping being somewhat exaggerated.
Figure 4:
Fig. 4 is a view similar to Fig. 3, but showing the parts in the ideal condition of perfect alinement.

As shown in Figs. 1, 3 and 4, the ball bearings comprise inner races 6, 6 and outer races 7, 7 supporting bearing balls 8, 8. The outer surfaces of the outer races 7, 7 are cylindrical and they are of a size to fit with a close fit in the bore 5. The inner races have interior cylindrical surfaces which fit the cylindrical exterior surface of a sleeve 9, which is adapted to hold the chuck $a$.

The ball bearings are adapted to be mounted on the sleeve 9 before they are placed in the bore 5 of the workhead. At one end of the sleeve 9 is an annular shoulder 10 which is engaged by one end of one of the inner race rings 6. This race ring 6 is separated from the opposite race ring 6 by a pulley 11, having a depression 12 in which the driving belt 13, that drives the chuck, is located. The pulley 11 at the same time serves as a separator to separate the inner race rings 6, 6, the ball bearings in this embodiment of the invention being tightened by holding the inner races rigidly apart while forcing the outer races 7, 7 toward each other. The inner part of the journal is completed by a ring 14, which screws onto a threaded portion 15 provided at that end of the sleeve 9 opposite the shoulder 10 and by means of which the two race rings are held together virtually as a unit. In order to make the drive of the workhead a positive one, a key 16 is provided to hold the pulley 11 to the sleeve 9, while once the ring 14 has been properly tightened, a hole may be drilled into the intermeshing threads of the ring and sleeve respectively, tapped, and a screw 17 screwed therein, thereby to lock the parts together.

It will be readily apparent that comparatively large ball bearings must be used in a workhead of this nature. While all ball bearings have a slight tendency to warp owing to the hardening processes which they must undergo, this is especially true of those having large and comparatively thin race rings. Fig. 3 shows such a bearing after the hardening process, the bearing comprising an inner race 6, an outer race 7 and balls 8, the warping being somewhat exaggerated. It will be apparent that the plane of revolution of the balls, which by definition is perpendicular to the axis of revolution, does not coincide with the plane perpendicular to the outer cylindrical surfaces of the race 7, which is in turn perpendicular to the axis of the cylinder represented by said exterior surfaces. Without going further into elementary geometrical principles, it will be readily apparent that such a ball bearing can not run true. It would be a false assumption to assume even that the circles of the races of the rings 6 and 7 represent true circles in any plane;—they are generally warped entirely out of a plane.

This condition although minute, and necessarily much exaggerated in Fig. 3, would prevent the proper functioning of the workhead except for the additional means provided by the invention, because commercial requirements now necessitate internal grinding of workpieces to within two-tenths of a thousandth of an inch and sometimes less. It has been found impossible to obtain perfect ball bearing rings, and as a workhead of the type shown must revolve in ball bearings, and can not have a long spindle, from the nature of the requirements as heretofore explained, I have provided means for correcting the deformation of the bearing rings so that they will assume the condition of Fig. 4.

The inner rings 6, 6, being smaller, are less subject to warpage, and may be tightly compressed by the ring 14. In prior ball bearing mountings some means has usually been provided for producing a relative side thrust of one ring on the other, in order to tighten the bearing. Thus one set of rings are held solidly and the other set are projected sidewise, and in the nature of the case can not be held solidly, because they are moved until the play in the bearings themselves provides resistance to the moving forces. It is this pair of bearing races which present the chief problem both because of the fact that they are larger and because of the fact that they are not commonly held solidly, as in the case of the other pair.

Continuing now to describe the illustrative embodiment of the invention, I provide spreaders 18, 18 which together fill the space between the outer races 7, 7, but are nevertheless, taken together, somewhat less wide than the separating means 11, or at least they are so located with respect to the centers of the race rings that a lateral thrust can be produced on the bearings. I provide a pair of rings 19, 19 fastened to the workhead fixture 3a by a plurality of screws 20. These rings overlap the outer race rings 7, 7, as will be readily apparent from the drawing. I further provide a plurality of small set screws 21 in each ring 19, said set screws being located in holes 22 which are in line with approximately the mid portion of the rings 7, 7. These screws may be tightened upon the rings 7 wherever these are warped outwardly, and by thus tightening them, the outer rings are forced into correct alinement against the spreaders 18, 18, whose side surfaces have been ground to true planes. In this manner the ball bearings may be tightened and at the same time the warpage of the outer races 7, 7 corrected.

Referring to Fig. 2, it will be seen that a great number of screws 21, which are shown in dotted lines in said figure, are provided. Individual tightening of such of the screws 21 as rest against outwardly warped portions of the rings 7 is much more effective for forcing said rings into correct alinement than the mere end pressure of a ring or other device having a flat plane surface, since it enables the pressure to be produced where pressure is needed. I have found that a ball bearing workhead provided with the alining means of the invention produces much more accurately ground workpieces than has hitherto been possible in sleeve workheads of this type.

The chuck $a$ illustrated in the drawings may be of any suitable type so far as the present invention is concerned;—the details of said chuck are not described herein for that reason, and because they are described and claimed in another application. Likewise certain features of the workhead, although shown are not described herein, since they are made the subject matter of other applications.

I claim,

1. A workhead adapted for the rotatable holding of a chuck comprising a sleeve, a pair of ball bearings mounted on said sleeve, an annular member holding the outer races of said ball bearings, and a plurality of screws generally parallel to the axis of said sleeve adapted to be urged into engagement with the outer races of said ball bearings to correct deformities therein.

2. A workhead comprising in combination, a chuck, a plurality of internal race rings holding said chuck, an annular workhead member, a plurality of outer race rings held in said annular workhead member, bearing balls located between said race rings, and means comprising a plurality of screws for exerting a side pressure on said outer race rings to aline the race rings and tighten the bearings.

3. A workhead comprising in combination, a chuck, a sleeve surrounding said chuck, said sleeve having a cylindrical surface and an annular shoulder, a pair of internal race rings mounted on said cylindrical surface, a spreader mounted between said race rings, one race ring being against said shoulder, a ring screwed onto said sleeve, one end being in engagement with the other race ring, a pair of outer race rings, bearing balls located in the races, an annular workhead member supporting the outer race rings, rings attached to the workhead member over-lapping the outer race rings, and a plurality of screws in said rings, whereby pressure may be exerted against the outer race rings to overcome deformities and to tighten the bearing.

4. A workhead comprising, in combination, a member providing a bore, a chuck, a ball bearing having races one of which is held to the chuck, and the other of which is held to the member providing the bore, a plurality of screws located to exert side pressure against one of said races to remove warpage therefrom, and a member within the bore of said first member presenting a true planar surface against which said race may be urged by said screws.

5. A workhead comprising, in combination, a member providing a bore, a chuck, a ball bearing having races one of which is held to the chuck, and the other of which is held to the member providing the bore, a ring fastened to one of the parts and overlapping one of the races, and a plurality of screws in said ring located to exert side pressure against one of said races to remove warpage therefrom.

6. A workhead adapted for the rotatable holding of a chuck, comprising a sleeve, a pair of inner race rings mounted in spaced relation on said sleeve, an annular member, a pair of outer race rings carried by said member, said race rings having race rings having raceways therein for the reception of bearing balls, and means comprising a plurality of screws for exerting a side pressure of variable degree at a plurality of points on said outer race rings to aline the raceways in said outer rings whereby said raceways will define parallel planes each perpendicular to the axis of rotation of said sleeve.

7. A workhead comprising in combination, a stationary member, a rotary member, a pair of ball bearings mounted in spaced relation in said stationary member to support said rotary member, said bearings having inner and outer race rings, raceways in the race rings and means comprising a plurality of spaced members adjustable along lines parallel to the axis of the chuck for exerting a side pressure of variable degree at uniformly spaced points on the outer race rings to bring the raceways in said outer race rings into parallel relation one with the other and at right angles to the axis of said rotary member, said raceways defining planes, whereby the bearing balls in the bearings will rotate in parallel planes perpendicular to said rotary member.

WALDO J. GUILD.